US009503360B2

(12) United States Patent
Bragg

(10) Patent No.: US 9,503,360 B2
(45) Date of Patent: Nov. 22, 2016

(54) METHOD AND APPARATUS FOR TRAFFIC ENGINEERING IN SHORTEST PATH BRIDGED NETWORKS

(75) Inventor: Nigel Lawrence Bragg, Cambridge (GB)

(73) Assignee: Ciena Corporation, Hanover, MD (US)

( * ) Notice: Subject to any disclaimer, the term of this patent is extended or adjusted under 35 U.S.C. 154(b) by 444 days.

(21) Appl. No.: 12/891,351

(22) Filed: Sep. 27, 2010

(65) Prior Publication Data

US 2012/0076014 A1 Mar. 29, 2012

(51) Int. Cl.
*G06F 15/173* (2006.01)
*H04L 12/707* (2013.01)
*H04L 12/701* (2013.01)
*H04L 12/705* (2013.01)
*H04L 12/721* (2013.01)
*H04L 12/803* (2013.01)
*G06F 12/00* (2006.01)

(52) U.S. Cl.
CPC .............. *H04L 45/22* (2013.01); *H04L 45/00* (2013.01); *H04L 45/18* (2013.01); *H04L 45/66* (2013.01); *H04L 47/122* (2013.01)

(58) Field of Classification Search
CPC ........................................................ H04L 12/28
USPC ............. 370/229, 237, 238, 238.1, 351–359, 370/389, 392, 395.1, 397–399, 400, 401; 709/238, 242
See application file for complete search history.

(56) References Cited

U.S. PATENT DOCUMENTS

| 6,917,985 | B2 * | 7/2005 | Madruga et al. ............. 709/238 |
| 7,362,703 | B1 * | 4/2008 | Taft ......................... H04L 45/06 370/230 |
| 7,688,756 | B2 | 3/2010 | Allan et al. |
| 7,911,944 | B2 * | 3/2011 | Chiabaut ................. H04L 45/00 370/229 |
| 7,995,481 | B2 * | 8/2011 | Kokje et al. .................. 370/238 |
| 8,224,971 | B1 * | 7/2012 | Miller et al. ................. 709/227 |

(Continued)

OTHER PUBLICATIONS

European Search Report and Written Opinion dated Jan. 25, 2012 for European Application Serial No. 11182887.7-1525, European Filing Date: Sep. 27, 2011 consisting of 6 pages.

*Primary Examiner* — Zarni Maung
(74) *Attorney, Agent, or Firm* — Clements Bernard PLLC; Christopher L. Bernard; Lawrence A. Baratta, Jr.

(57) ABSTRACT

A method and apparatus for diverting traffic in a communications network are disclosed. According to one aspect, the invention provides a communications network with a first node and a second node. Connecting these two nodes is a first set of intermediate nodes on a first path (the true shortest path) and a second set of intermediate nodes on a second alternate path. At a first node, a first processor determines whether a packet arriving at the first node must transit the second node. If so, the base virtual local area network (VLAN) identifier (VID) of the packet is replaced by a first VID, and the packet is transmitted along the second path through the second set of intermediate nodes to the second node. At the second node, a second processor determines whether a packet arriving at the second node must transit the first node. If so, the base VID of the packet is replaced by a second VID different from the first VID and different from the base VID, and the packet is transmitted along the second path through the second set of intermediate nodes to the first node.

19 Claims, 6 Drawing Sheets

(56) References Cited

U.S. PATENT DOCUMENTS

| | | | |
|---|---|---|---|
| 8,711,863 B2* | 4/2014 | Allan et al. | 370/395.53 |
| 2005/0220096 A1* | 10/2005 | Friskney et al. | 370/389 |
| 2007/0086361 A1* | 4/2007 | Allan et al. | 370/254 |
| 2008/0107027 A1 | 5/2008 | Allan et al. | |
| 2009/0161669 A1* | 6/2009 | Bragg et al. | 370/389 |
| 2009/0168768 A1* | 7/2009 | Chiabaut | H04L 45/00 370/389 |
| 2010/0271938 A1* | 10/2010 | Mutoh | 370/228 |

* cited by examiner

METHOD AND APPARATUS FOR TRAFFIC ENGINEERING IN SHORTEST PATH BRIDGED NETWORKS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to network communications, and in particular to a method and system for diverting traffic in a carrier Ethernet network.

BACKGROUND OF THE INVENTION

In Ethernet network architectures, devices connected to the network compete for the ability to use shared communications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast on the network. Since routes were learned by broadcasting a frame and waiting for a response, and since both the request and response would follow the spanning tree, all of the traffic would follow the links that were part of the spanning tree. This often led to over-utilization of the links that were on the spanning tree and non-utilization of the links that weren't part of the spanning tree.

To overcome some of the limitations inherent in Ethernet networks, a link state protocol controlled Ethernet network was disclosed in U.S. Pat. No. 7,688,756, filed Oct. 2, 2006, entitled "Provider Link State Bridging," the entire contents of which are hereby incorporated herein by reference. As described in greater detail in that patent, the nodes in a link state protocol controlled Ethernet network exchange Hello messages to learn their adjacencies to other nodes on the network, and transmit link state advertisements to enable each node on the network to build a common view of the network topology, held in a link state database. The link state database may be used to compute shortest paths through the network. As used herein "shortest paths" can be based on a calculated metric, hop count, etc. Each node then populates a Filtering Database (FDB) which is used by the node to make forwarding decisions so that frames will be forwarded over the computed shortest path to the destination. Since the shortest path to a particular destination is always used, the network traffic will be distributed across a larger number of links and follow a more optimal path for a larger number of nodes than where a single Spanning Tree or even multiple Spanning Trees are used to carry traffic on the network.

Link state protocol controlled Ethernet networks generally provide best effort service, in which network elements provide no guarantee that a particular frame will be transmitted across the network, merely that it will be forwarded if possible along the shortest path between any two points. That is, the network elements on a link state protocol controlled Ethernet network do not reserve portions of the bandwidth for particular traffic, but rather transmit traffic on a path assigned on the basis of available physical capacity without considering the actual traffic matrix imposed on the network. This means that any mismatch between offered load and physical network build can result in persistent congestion.

When congestion occurs on the network, traffic is dropped in transit and will need to be re-sent or, where re-sending is not possible due to application constraints, the application itself is degraded. The longer term response is to install additional capacity on links that are either overloaded or approaching overload, but a technique to divert some traffic away from a hot spot and onto underutilized parts of the network is required to address problems that emerge between planning cycles. A further useful capability is the ability to completely divert traffic off a specific link for maintenance purposes without disrupting the network topology. Accordingly, it is desirable to selectively define paths that follow routes other than the shortest paths in a link state protocol controlled Ethernet network.

SUMMARY OF THE INVENTION

The present invention advantageously provides a method and system for diverting traffic from a true shortest path to an alternate path in a communications network. This is in contrast to earlier referenced U.S. Pat. No. 7,688,756 in which a complete shortest path forwarding plane offers connectivity between all nodes in the network and is associated with a single virtual local area network (VLAN) identifier (VID), known as the base VID for that forwarding plane.

According to one aspect, the present invention provides a communications network with a first node and a second node. Connecting these two nodes is a first set of intermediate nodes on a first path (the true shortest path) and a second set of intermediate nodes on a second (alternate) path. At a first node, a first processor determines whether a packet arriving at the first node must transit the second node. If so, the base VID of the packet is replaced by a first VID, and the packet is transmitted along the second path through the second set of intermediate nodes to the second node. At the second node, a second processor determines whether a packet arriving at the second node must transit the first node. If so, the base VID of the packet is replaced by a second VID different from the first VID and different from the base VID, and the packet is transmitted along the second path through the second set of intermediate nodes to the first node.

According to another aspect, the first processor may determine whether a second packet received at the first node must transit one of the second set of intermediate nodes without transiting the second node. If so, the base VID of the second packet is replaced by the first VID, and sent to the one of the second set of intermediate nodes. At the intermediate node, a second processor determines that the second packet must leave the second path at the intermediate node. In this case, the first VID of the second packet is replaced by the base VID before transmitting the second packet to a next node.

According to another aspect, a node in a communications network is capable to route traffic from an input port to one of a first and second output port. The node comprises a memory and a processor in communication with the memory. The memory stores a forwarding table associated with the base VID that directs packets having a first Media Access Control (MAC) address to transit a second path via the second port when traffic is to be diverted from a first path reachable by the first port. The directed packets are assigned a first VID before transmitting the packets from the second output port. The processor inspects the first MAC address in a header of a first packet received at the first node and determines that the inspected first MAC address is an address of a location reachable via the second port. The processor replaces the base VID of the first packet with a first VID different from the base VID. The processor diverts the first packet via the second port to the second path.

According to another aspect, the processor of the node is further operable to inspect a second MAC address in a header of a second packet to determine that the second MAC address is an address reachable from an intermediate node via the second output port without transiting a second node. In this case, the processor replaces a base VID of the second packet with the first VID, before transmitting the second packet to the intermediate node via the second output port. The consequence of this is that all traffic leaving the node via the second output port is marked with the first VID, not the base VID.

According to another aspect, the invention provides a method for diverting packets of information in a communications network between a first node and a second node from a first shortest path to a second path different from the first shortest path. The method includes associating a first VID with the second path in a first direction from the first node to the second node, and associating a second VID with the second path in a second direction from the second node to the first node. Packets are diverted from the first path to a link that is the first hop on the second path when the packets have a MAC address reachable via the first shortest path. All packets that transit the first hop in the first direction are assigned the first VID and all packets that transit the first hop in the second direction are assigned the second VID.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
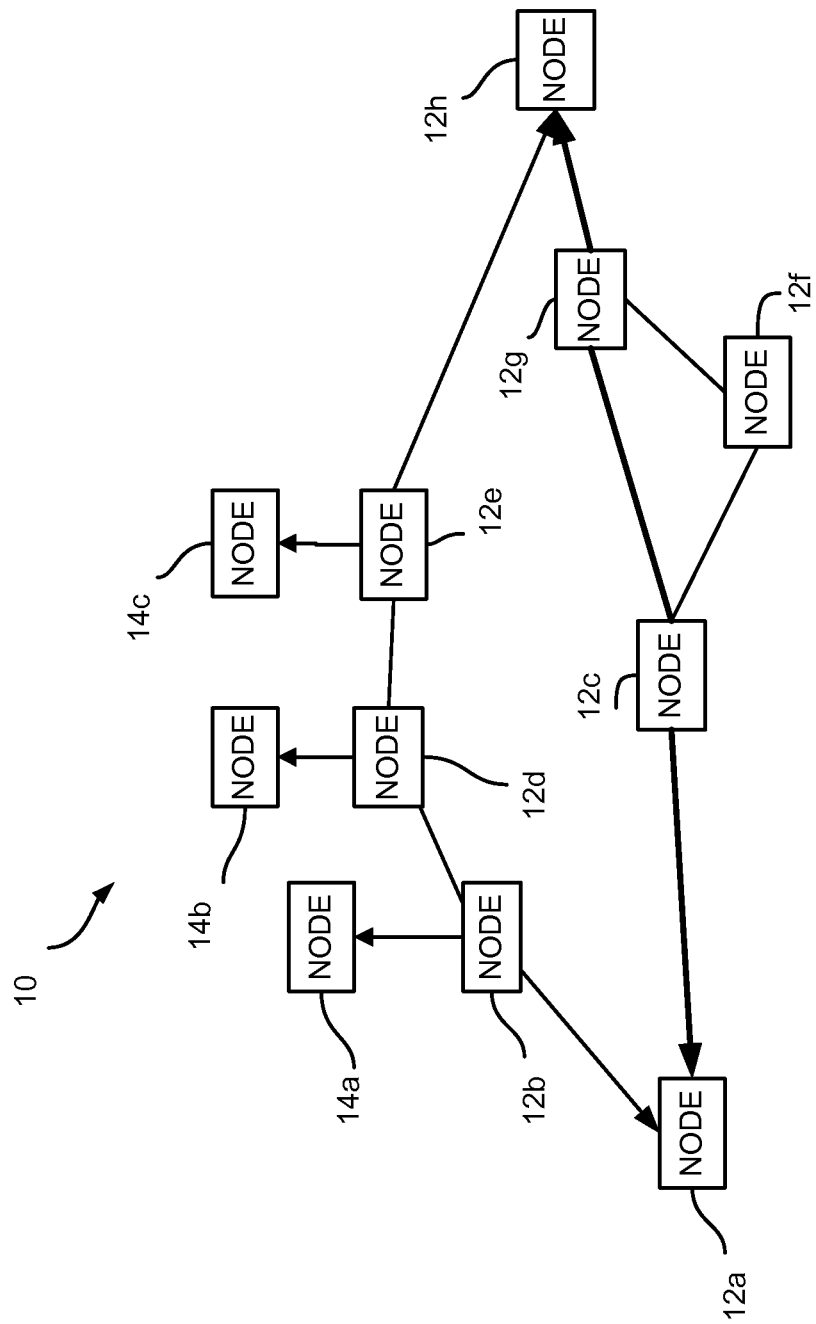
FIG. 1 is a block diagram of a plurality of nodes in a network with a shortest path and an alternate path between two nodes.

Before describing in detail exemplary embodiments that are in accordance with the present invention, it is noted that the embodiments reside primarily in combinations of apparatus components and processing steps related to implementing a system and method for reducing congestion by diverting traffic away from congested paths. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which reference designators refer to like elements, there is shown in FIG. 1 a block diagram of an exemplary system constructed in accordance with the principles of the present invention and designated generally as "10". System 10 includes a plurality of nodes 12a-12h (referred to collectively herein as nodes 12.). Referring to the system 10 in FIG. 1, a shortest path is computed between the nodes 12a and 12h, which traverses intermediate nodes 12c and 12g. This shortest path, which will be referred to herein as the true shortest path, may be computed using Provider Link State Bridging (PLSB) protocol as described in U.S. Pat. No. 7,688,756, the entire contents of which are incorporated herein by reference. FIG. 1 also shows an alternate path between nodes 12a and 12h, which traverses nodes 12b, 12d, and 12e. In some embodiments, this path is the next shortest path apart from the true shortest path. Or alternatively, the cost of this alternate path may be equal to the cost of the true shortest path, and the alternate path may be selected by a tie-breaking algorithm used in the event of two paths having equal cost.

The nodes along the true shortest path and the nodes along the alternate path are associated with a base Virtual Local Area Network (VLAN) Identifier (VID). This base VID defines a single instance of a PLSB forwarding plane, comprising a complete set of Shortest Path Trees which mesh the entire network. There may be many such forwarding planes, for example for load balancing purposes, but in the PLSB embodiment disclosed in U.S. Pat. No. 7,688,756, a packet travels end to end across the network using a single (base) VID which is never changed in transit. Thus, for example, data packets received by node 12a destined for node 12h will have the base VID in their headers, and data packets received by node 12h destined for node 12a will also have the base VID in their headers.

In accordance with the principles of the invention, some or all of the traffic on the true shortest path may be diverted to the alternate path. Each direction on the alternate path is associated with a new Virtual LAN Identifier (VID). Thus, a first VID is associated with a first path from node 12a to node 12h through nodes 12b, 12d, and 12e, and a second VID is associated with a second path from node 12h to node 12a through nodes 12e, 12d and 12b. Therefore, the ports of nodes 12b, 12d and 12e lying on the alternate path have forwarding tables in each of these nodes associated with the first VID for traffic which transits node 12a but leaves the alternate path at 12b (to node 14a), 12d (to node 14b) or 12e (to node 14c), and also with the first VID for traffic transiting both nodes 12a and 12h. Similarly, the ports of nodes 12e, 12d and 12b lying on the alternate path have forwarding tables in each of these nodes associated with the second VID for traffic which transits node 12h, but leaves the alternate path at 12e (to node 14c), 12d (to node 14b) or 12b (to node 14a), and also with the second VID for traffic transiting both nodes 12h and 12a. Note that data which joins the alternate path at nodes 12b, 12d, or 12e, irrespective of its ultimate destination or the path to it, is transmitted only with the base VID.

The distribution of the alternate path definition and making that definition available to the PLSB routing system may be achieved by a number of techniques. The definition of the alternate path may be configured on those nodes which need to be aware of it, it may be signaled as an Explicit Route Object (ERO), or the ERO could be configured into the PLSB Intermediate System-Intermediate System (IS-IS) routing system at a single node, and then flooded by IS-IS protocol.

Traffic transiting both nodes 12a and 12h is associated with the first and second VIDs. One possibility for alternate routing of traffic would be to put only that traffic which is to transit nodes 12a and 12h through the alternate path onto a single alternate VID. However, the traffic which transits node 12a, but leaves the alternate path at 12b, 12d or 12e would remain on the base VID. Such a scheme would require making a decision to replace the base VID by the VID associated with the alternate path for traffic arriving at node 12a or node 12h based on the MAC address of the traffic. This would violate the Ethernet architecture standards, which do not allow a forwarding decision using the MAC address to control a VID re-assignment. Thus, this solution would preclude interoperation of bridges built using only standard Ethernet functions.

However, the Ethernet architecture does allow VIDs to be changed or merged on a per port basis. One motivation for this feature is to eliminate the need for the allocation of VIDs at domain boundaries to be coordinated. The methods described herein can also be used to configure an alternate route, such that the semantics of a VLAN are preserved; the VLAN is just being renamed. By using a different VID in each direction, the traffic which should travel via node 12a but then leaves the alternate path at 12b, 12d or 12e may be tagged with the first VID (rather than the base VID), because for that traffic the forwarding table entries will always be identical to those associated with the base VID for this set of paths. Similarly, the traffic which should travel via node 12h but then leaves the alternate path at 12e, 12d or 12c may be tagged with the second VID (rather than the base VID). This is because on either VID (the base VID or the appropriate VID associated with the alternate path), the only traffic which is being marked with that VID is transiting a single known point, either node 12a or node 12h, and there can be only a single shortest path tree from either of those points to any destination. If only a single VID was used, the same forwarding table would be used for traffic from both nodes 12a and 12h, and conflicting entries could arise at the intermediate nodes 12b, 12d or 12e, because some traffic may be seen twice, once on the alternate path to one of the endpoints (node 12a or 12h), and again on its return from the endpoint prior to leaving the alternate path.

When there is congestion along the true shortest path, traffic along the true shortest path may be re-routed along the alternate path. For example, if the link from node 12c to node 12g becomes heavily loaded with traffic between those two nodes, it may be desired to offload the traffic to the alternate route. Similarly, when maintenance is to be performed on a node or segment of the true shortest path, all of the traffic along the true shortest path may be re-routed along the alternate path. Before traffic is re-routed to the alternate path, nodes 12a, 12b, 12d and 12e is configured with the routing parameters for the alternate path and the first VID and nodes 12h, 12e, 12d, and 12b is configured with the routing parameters for the alternate path and the second VID. This may be done using Provider Link State Bridging (PLSB) by setting the cost of an imaginary direct link from node 12a to node 12h, which physically passes through nodes 12b, 12d, and 12e, to equal the cost of the true shortest path minus 1, and associating this metric with the first VID. Similarly, the cost of an imaginary direct link from node 12h to node 12a, which physically passes through nodes 12e, 12d, and 12b is set equal to the cost of the true shortest path minus one, and this metric is associated with the second VID. Alternatively, the cost of the imaginary direct link in each direction may be set equal to that of the true shortest path, with the alternate path being selected preferentially by a tie-breaking algorithm. Alternatively, the cost of the imaginary direct link representing the alternate path may be set equal to a cost of the true shortest path minus a fraction that is less than the cost of any link in the network.

Figure 2:
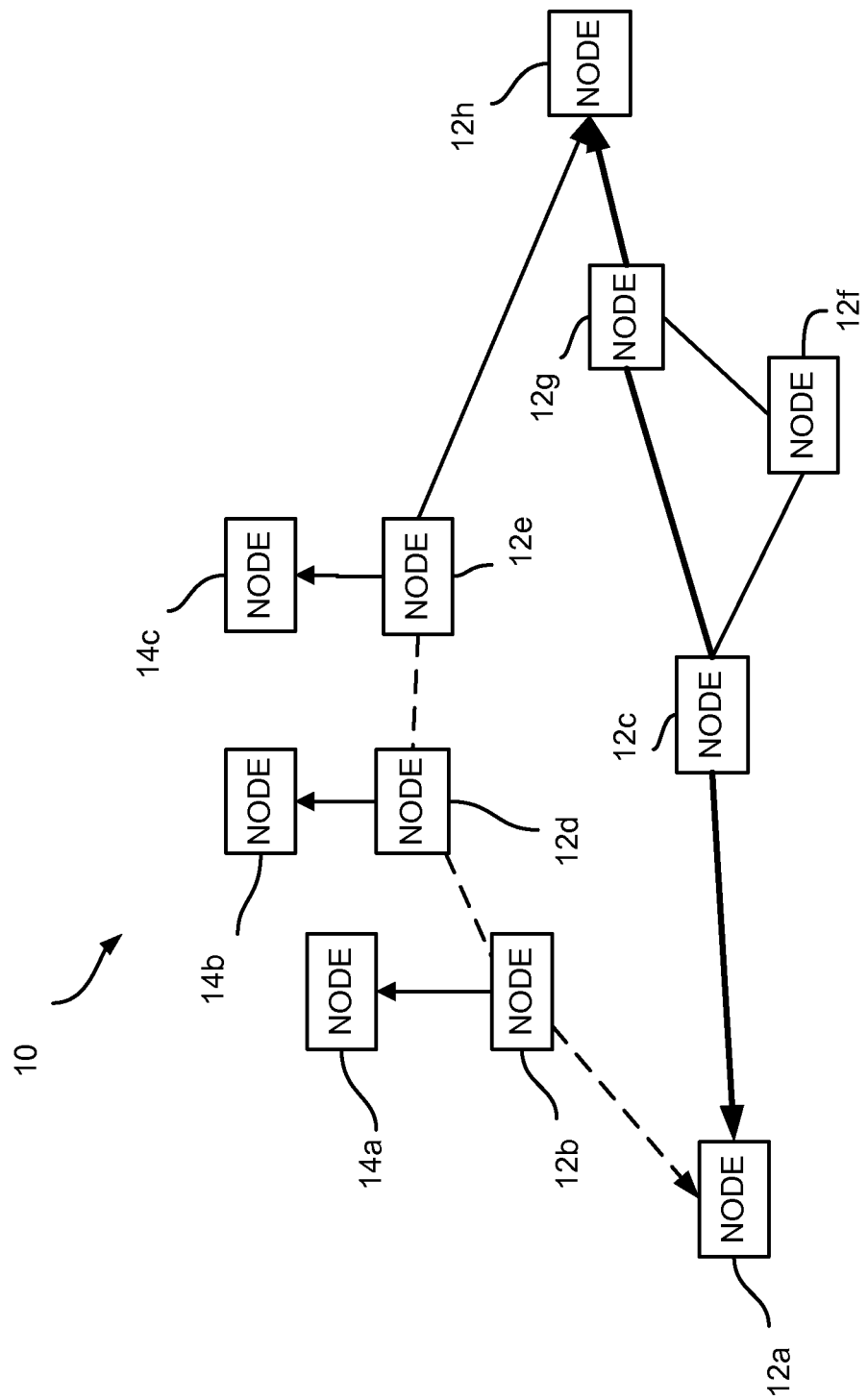
FIG. 2 is a block diagram of the portion of the network shown in FIG. 1, illustrating a path associated with a first virtual local area network ID (VID)

FIG. 2 is a diagram of the portion of the network shown in FIG. 1. In FIG. 2, the dashed line shows a path associated with a first VID that is different from the base VID. Packets arriving at node 12a with the base VID in their headers and having a MAC address of a destination reachable via a first hop from node 12a to node 12b, are sent along the first hop in the direction of the path shown by the dashed line in FIG. 2. Thus, for example, when a packet arrives at node 12a with a MAC address for node 14a, the base VID of the packet is replaced by the first VID associated with the path shown by the dashed line in FIG. 2, because its next hop is along the same link as the alternate path, and the packet is sent to node 12b. At node 12b, the first VID is replaced by the base VID and the packet is forwarded to node 14a.

When a packet arriving at node 2 has a MAC address of a destination that is reachable by node 12h, the first VID is assigned to the packet before transferring it from node 12a along the alternate path shown by the dashed line in FIG. 2. The packet is forwarded with the first VID until it reaches node 12e. At node 12e, the first VID is replaced by the base VID at the egress port of node 12e and then forwarded to node 12h. Alternatively, the packet arriving at node 12h with the first VID may be forwarded to node 12h before replacing the first VID with the base VID at the ingress port of node 12h.

When a packet arrives at node 12a with a MAC address for node 12f, the forwarding table at node 12a indicates that the packet is to be forwarded to node 12f via node 12c on the base VID.

To accomplish the forwarding of traffic using the alternate path, node 12a has a forwarding table that directs packets to transit a first hop on the alternate path when the MAC address of the packet is reachable by one or more links of the alternate path. In one embodiment, establishing the forwarding table includes the alternate path in a shortest path calculation, wherein the alternate path from node 12a to node 12h is taken only by packets transiting both nodes 12a and 12h, and wherein all other packets are routed on shortest paths that would exist in the absence of the alternate path from node 12a to node 12h. For example, the forwarding table would show that the shortest path from node 12a to node 14a is via node 12b.

Figure 3:
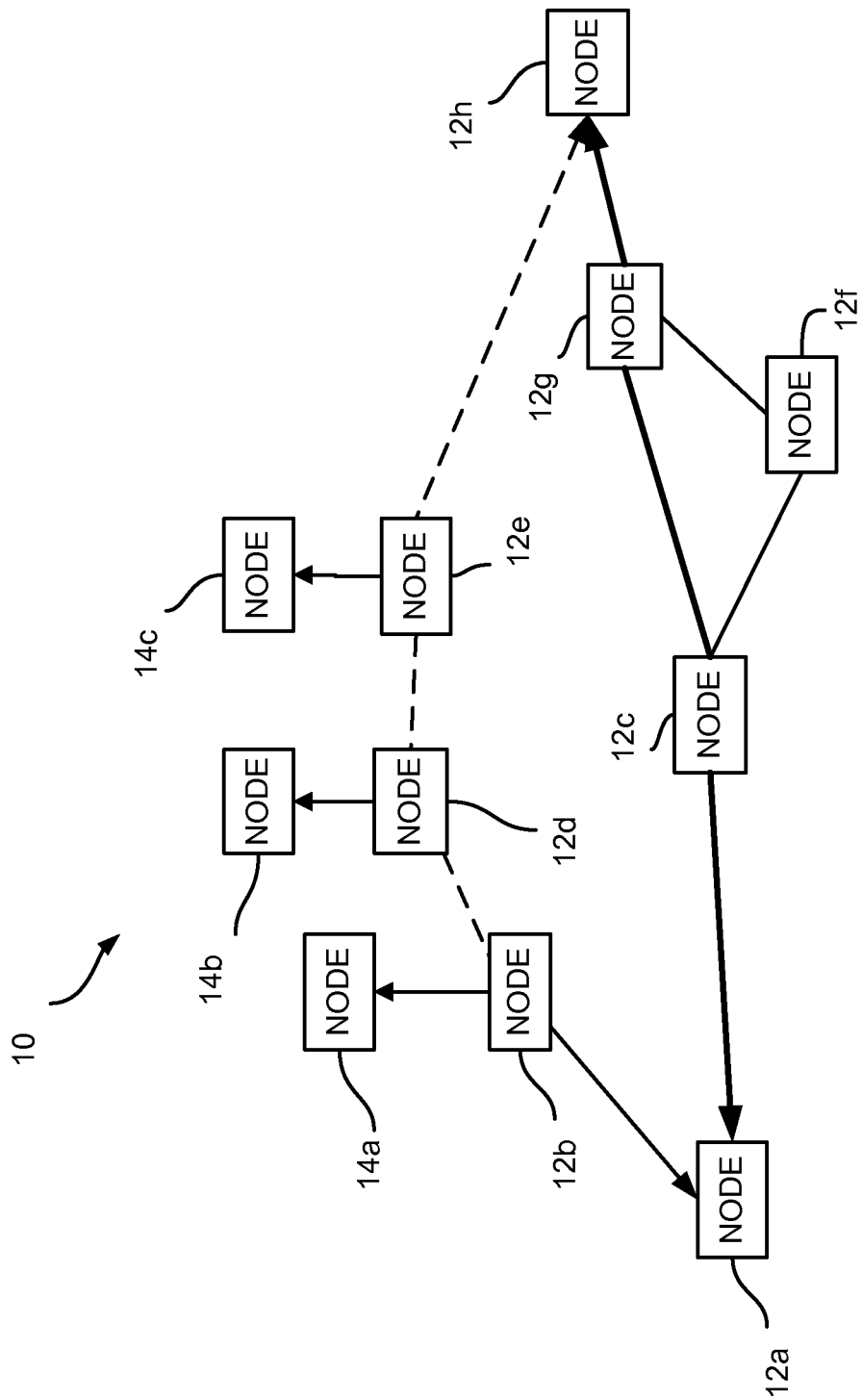
FIG. 3 is a block diagram of the portion of the network shown in FIG. 1, illustrating a path associated with a second VID.

FIG. 3 is a diagram of the portion of the network shown in FIG. 1. In FIG. 3, the dashed line shows a path associated with a second VID that is different from the base VID and that is different from the first VID associated with the dashed line path of FIG. 2. Packets arriving at node 12h with the base VID in their headers and having a MAC address of a destination reachable via a first hop from node 12h to node 12e are sent along the first hop in the direction of the path shown by the dashed line in FIG. 3. Thus, for example, when a packet arrives at node 12h with a MAC address for node 14a, the base VID of the packet is replaced by the second VID associated with the path shown by the dashed line in FIG. 3, because its next hop is along the same link as the alternate path, and the packet is sent to node 12b via node 12e and node 12d. At node 12b, the second VID is replaced by the base VID and the packet is forwarded to node 14a.

When a packet arriving at node 12h has a MAC address of a destination that is reachable by node 12a, the second VID is assigned to the packet before transferring it from node 12h along the alternate path shown by the dashed line in FIG. 3. The packet is forwarded with the second VID until it reaches node 12b. At node 12b, the second VID is replaced by the base VID at the egress port of node 12b and the packet is then forwarded to node 12a. Alternatively, the packet arriving at node 12b with the second VID may be forwarded to node 12a before replacing the second VID with the base VID at the ingress port of node 12a.

When a packet arrives at node 12h with a MAC address for node 12f, the forwarding table at node 12h indicates that the packet is to be forwarded to node 12f via node 12g on the base VID.

To accomplish the forwarding of traffic using the alternate path, node 12h has a forwarding table that directs packets to transit a first hop on the alternate path when the MAC address of the packet is reachable by one or more links of the alternate path. In one embodiment, establishing the forwarding table includes the alternate path in a shortest path calculation, wherein the alternate path from node 12h to node 12a is taken only by packets transiting both nodes 12a and 12h, and wherein all other packets are routed on shortest paths that would exist in the absence of the alternate path from node 12h to node 12a. For example, the forwarding table would show that the shortest path from node 12h to node 14a is via nodes 12e, 12d, and 12b.

Thus, one embodiment is a method of diverting packets of information in a communications network between a first node and a second node from a first shortest path to a second path different from the first shortest path. The method includes associating a first VID with a first direction along the second path and associating a second VID with the opposite direction along the second path. Packets that have a MAC address of a location reachable via the first shortest path are diverted from the first shortest path to a link that is the first hop on the second path. A first VID is assigned to all packets transiting a link that is the first hop along the second path in a first direction, and a second VID is assigned to all packets transiting a link that is the first hop along the second path in a second direction opposite the first direction.

Figure 4:
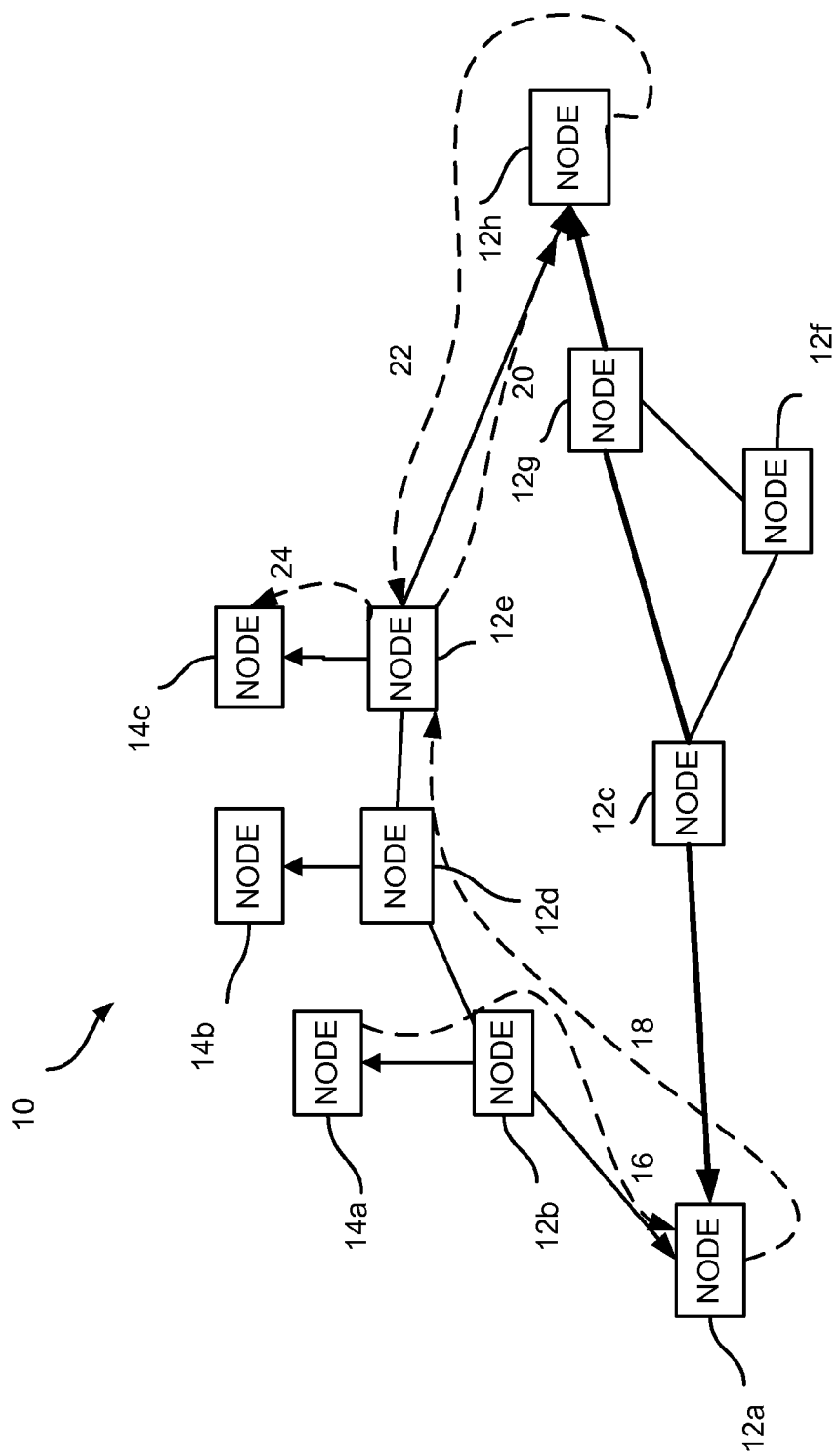
FIG. 4 is a block diagram of traffic being routed from a first node to a second node using the base VID and a first and second VID.

FIG. 4 is a diagram of traffic routed from node 14a to node 14c when the forwarding tables of nodes 12a and 12h are derived for the alternate paths shown in FIGS. 2 and 3. In this example, the shortest path between nodes 12b and 12e was originally via the true shortest path between nodes 12a and 12h (so via nodes 12c and 12g), and so the installation of an alternate path using the methods described herein results, quite correctly, in the hairpin path shown. The paths taken in this case are shown by dashed lines 16, 18, 20, 22, and 24. In FIG. 4, a packet arriving at node 14a destined for node 14c is transmitted on the base VID to node 12a via node 12b on path 16. At node 12a, the base VID of the packet is replaced by the first VID and the packet is routed to node 12e via nodes 12b and 12d on path 18. At node 12e, the first VID is replaced by the base VID and the packet is routed to node 12h on path 20. At node 12h, the base VID is replaced by the second VID and the packet sent to node 12e on path 22. At node 12e, the second VID is replaced by the base VID and the packet is forwarded to node 14c on path 24. This example illustrates how this technique results in self-consistent forwarding, for example preserving the properties disclosed in earlier referenced U.S. Pat. No. 7,688,756, in particular the congruence of unicast and multicast forwarding in both directions.

Figure 5:
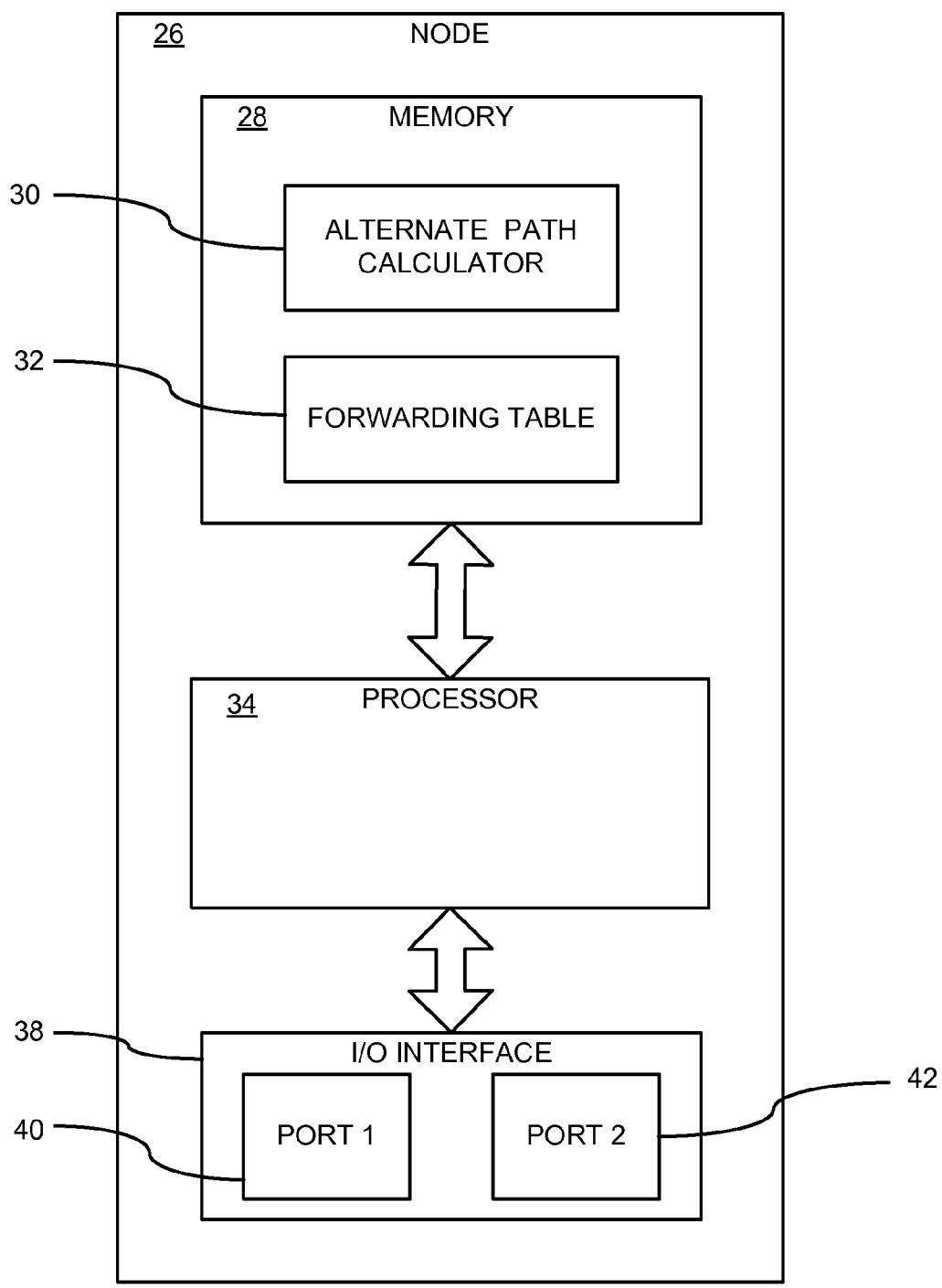
FIG. 5 is a block diagram of a node having a memory and a processor for computing an alternate path.

FIG. 5 is a block diagram of an embodiment of a node such as a node 12 or 14 of FIGS. 1-4 (shown in FIG. 5 as node 26). The node 26 may be a router or a switch or other communication device. The node 26 may communicate with other nodes by optical fiber/wire or wirelessly. The node 26 may be in an optical network in which the nodes are partially or fully connected by optical fibers, a copper network connected by copper conductors or a combination of both. The node 26 has a memory 28 and a processor 34. The memory 28 stores an alternate path calculator 30 and a forwarding table 32. The processor 34 executes alternate path calculation code to implement the alternate path calculator 30. The alternate path calculator 30 calculates the alternate path necessary to divert traffic away from the true shortest path between nodes 12a and 12h, as described above. FIG. 5 also shows an Input/Output (I/O) interface 38 with a first port 40 and a second port 42. These ports may be physical ports or logical ports associated with a single physical port.

Thus, one embodiment is a first node in a communication network capable of diverting traffic away from a first shortest path to an alternate path between two nodes. The first node has a first port 40 and a second port 42. The first port 40 connects traffic to the first shortest path and the second port 42 connects traffic to the alternate path between the two nodes. The first node includes a memory to store a first forwarding table that directs packets having a first MAC address to transit the alternate path via of the second port 42. Packets directed to transit the alternate path via the second port 42 are assigned a first VID by egress processing within port 42, the packets initially having a base VID. The first node also includes a processor. The processor inspects the first MAC address of a first packet received at the first node. The processor determines when the inspected first MAC address is an address of a location reachable via the second port 42. If so, the packet is diverted to the second port 42 of the first node, and a base VID of the packet is replaced by a first VID associated with the alternate path.

The processor is further operable to inspect a second MAC address in a header of a second packet and determining that the second MAC address is an address of a location reachable from an intermediate node via the second port 42 without transiting a second node. The processor is operable to replace a base VID of the second packet with the first VID before forwarding the packet from the first node to the intermediate node. The first VID is associated with a first hop along the alternate path via the second port 42.

Another embodiment is a communications network having a first node and second node separated by a first set of intermediate nodes on a first path (the true shortest path) connecting the first and second nodes and a second set of intermediate nodes on a second alternate path connecting the first and second nodes. At the first node is a first processor to determine whether a first packet received at the first node is to transit the second node to reach a destination address specified by a MAC address in a header of the packet. When the first packet is to transit the second node, a base VID of the packet is replaced by a first VID associated with the second path through the second set of intermediate nodes.

The first processor of the first node may also determine whether a second packet received at the first node must transit one of the first set of intermediate nodes without transiting the second node. In this case, the first node replaces a base VID of the second packet with the first VID, and then transmits the second packet along the second path to the one of the second set of intermediate nodes.

The first processor may also determine that a third packet received at the first node must transit one of the first set of intermediate nodes without transiting the second node. In this case, the third packet is transmitted to the one of the first set of intermediate nodes without replacing the base VID of the third packet.

The second node of the communications network also has a second processor to determine whether a packet received at the second node must transit the first node to reach its destination according to a MAC address in the header of the packet. In this case, the base VID of the packet is replaced by a second VID, and the packet is transmitted to the first node along the second path through the second set of intermediate nodes.

The second processor additionally determines whether a second packet received at the second node must transit one of the second set of intermediate nodes without transiting the first node. In this case, the base VID of the second packet is replaced with the second VID, and the second packet is transmitted to the one of the second set of intermediate nodes.

The communications network may also include, at the one of the second set of intermediate nodes, a third processor for replacing the second VID in the header of the second packet with the base VID before forwarding the second packet to a next node, not being the second node, toward its ultimate destination.

Figure 6:
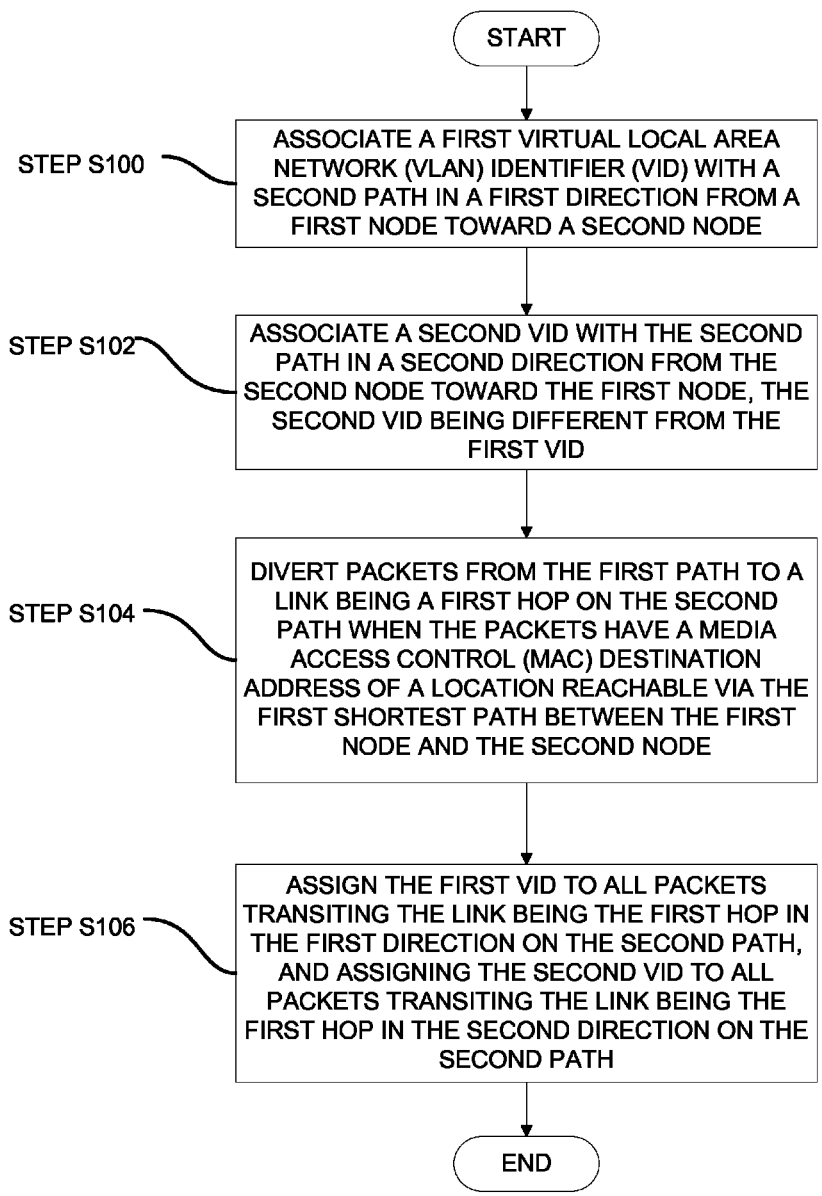
FIG. 6 is a flow chart of a method for diverting traffic in accordance with the principles of the present invention.

FIG. 6 is a flow chart of a method for diverting traffic in a communications network. A first VID is associated with a second (alternate) path in a first direction from a first node toward a second node (step S100). A second VID is associated with the second path in a second direction from the second node toward the first node (step S102). All packets having a MAC destination address of a location reachable via a true shortest path between the first and second nodes are diverted to a link that is a first hop on the second path (step S104). The first VID is assigned to all packets transiting the first hop in the first direction, and the second VID is assigned to all packets transiting the first hop in the second direction (step S106).

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of diverting packets of information in a communications network between a first node and a second node from a first shortest path to a second path, the second path different from the first shortest path, the method comprising:
    associating a first virtual local area network (VLAN) identifier (VID) with the second path in a first direction from the first node toward the second node;
    associating a second VID with the second path in a second direction from the second node toward the first node, the second VID being different from the first VID;
    diverting packets from the first shortest path to a link being a first hop on the second path when the packets have a Media Access Control (MAC) destination address of a location reachable via the first shortest path between the first node and the second node by reducing a cost of the second path to be less than or equal to a cost of the first shortest path by setting the cost of the second path based on the cost of the first shortest path for a shortest path calculation at the first node;
    assigning the first VID to all packets transiting a link being a first hop in the first direction on the second path, and assigning the second VID to all packets transiting a link being a first hop in the second direction on the second path, wherein a routing protocol of the first shortest path and a routing protocol of the second path are a same routing protocol; and
    establishing a first forwarding table at the first node that directs packets having a first MAC address to transit the second path, wherein the first MAC address addresses a location reachable by the first shortest path in the absence of packet diversion.

2. The method of claim 1, further comprising establishing a second forwarding table at the second node that directs packets having a second MAC address to transit the second path, wherein the second MAC address addresses a location reachable by the first shortest path in the absence of packet diversion.

3. The method of claim 1, wherein establishing the first forwarding table comprises including the second path in the shortest path calculation, the shortest path calculation populating the first forwarding table, wherein the second path is to be taken only by packets transiting both the first and second nodes, and wherein all other packets are routed on shortest paths that exist in the absence of the second path.

4. The method of claim 1, wherein the cost of the second path is set to be fractionally less than the cost of the first shortest path, wherein the fraction is less than the cost of any link in the network.

5. The method of claim 1, wherein the cost of the second path is equal to the cost of the first shortest path, and wherein the second path is preferred to the first shortest path by policy when the costs of the paths are equal.

6. The method of claim 1, further comprising:
receiving a packet at the first node, the packet having a header, the header containing a MAC destination address and a base VID;
determining that the MAC destination address is reachable from the first node via the second node along the second path;
forwarding the packet towards the link being the first hop of the second path;
replacing the base VID with the first VID;
transmitting the packet along the second path toward the second node;
replacing the first VID with the base VID in the header before the packet transits the second node.

7. The method of claim 1, further comprising:
receiving a packet at the first node, the packet having a header, the header containing a MAC destination address and a base VID;
determining that the MAC destination address is reachable from the first node through an intermediate node on the second path without transiting the second node;
forwarding the packet towards the link being the first hop of the second path;
replacing the base VID contained in the header with the first VID;
transmitting the packet to the intermediate node;
leaving the route of the second path at the intermediate node on the basis of a forwarding table that is associated with the first VID; and
replacing, at the intermediate node, the first VID contained in the header with the base VID.

8. The method of claim 1, wherein the same routing protocol is a Provider Link State Bridging (PLSB) routing protocol.

9. A first node in a communications network, the first node configured to route traffic from an input port of the first node to one of a first output port or a second output port of the first node, the first node comprising:
a memory, the memory storing a forwarding table, the forwarding table directing packets having a first Media Access Control (MAC) address to transit a second path via the second output port, the directed packets being assigned a first virtual local area network (VLAN) identifier (VID), the directed packets received at the first node initially having a base VID, the first VID being different from the base VID; and
a processor in communication with the memory, the processor configured to:
inspect a first MAC destination address in a header of a first packet received at the first node;
determine that the inspected first MAC destination address is an address of a location reachable via the second port;
divert the first packet to the second port by reducing a cost of the second path to be less than or equal to a cost of the first shortest path by setting the cost of the second path based on the cost of the first shortest path for a shortest path calculation at the first node; and
replace the base VID of the packet with the first VID, wherein a routing protocol of a first shortest path and a routing protocol of the second path are a same routing protocol, and wherein the base VID is further associated with the first shortest path to a second node that is reachable via the first port in the absence of packet diversion.

10. The first node of claim 9, wherein the processor further:
inspects a second MAC destination address in a header of a second packet received at the first node;
determines that the inspected second MAC destination address is an address of a location reachable from an intermediate node via the second port without transiting a second node; and
replaces a base VID of the second packet with the first VID.

11. The first node of claim 9, wherein the processor is an application specific integrated circuit.

12. A communications network comprising:
a first node;
a second node; and
a first set of one or more intermediate nodes on a first path between the first and second nodes, the first path being a shortest path between the first and second nodes, and a second set of one or more intermediate nodes on a second path between the first and second nodes;
the first node having a first processor, the first processor configured to:
inspect a first Media Access Control (MAC) address in a header of a first packet;
determine that the first packet must transit the second node to reach a destination based on the inspected first MAC address;
divert the first packet to the second node by replacing a base virtual local area network (VLAN) identifier (VID) with a first VID in the header of the first packet and reduce a cost of the second path to be less than or equal to a cost of the first shortest path by setting the cost of the second path based on the cost of the first shortest path for a shortest path calculation at the first node; and
transmit the first packet to the second node along the second path through the second set of one or more intermediate nodes, wherein a routing protocol of the first path and a routing protocol of the second path are a same routing protocol, and wherein the base VID is further associated with the first shortest path to a second node that is reachable via the first port in the absence of packet diversion.

13. The communications network of claim 12, wherein:
the first processor further:
determining whether a second packet received at the first node must transit one of the second set of intermediate nodes without transiting the second node;
when the second packet must transit one of the second set of intermediate nodes without transiting the second node, replacing a base VID with the first VID in a header of the second packet; and
transmitting the second packet toward the one of the second set of intermediate nodes along the second path; and
further comprising, at the one of the second set of intermediate nodes, a second processor, the second processor:
determining that the second packet must leave the second path at the intermediate node; and
replacing the first VID with the base VID before transmitting the second packet to a next node, the next node not being on the second path.

14. The communications network of claim 12, wherein the first processor further:

determines whether a second packet received at the first node must transit one of the first set of intermediate nodes without transiting the second node; and when the second packet must transit one of the first set of intermediate nodes without transiting the second node, transmitting the second packet toward the one of the first set of intermediate nodes along the first path without replacing a VID of the packet.

15. The communications network of claim 12, wherein the second node has a second processor, the second processor:

determining whether a second packet received at the second node must transit the first node to reach a destination;

when the second packet must transit the first node, replacing the base VID with a second VID in a header of the second packet; and transmitting the second packet to the first node along the second path, the second VID not equal to the first VID or the base VID.

16. The communications network of claim 15, wherein: the second processor further:

determining whether a third packet received at the second node must transit one of the second set of intermediate nodes without transiting the first node;

when the third packet must transit one of the second set of intermediate nodes without transiting the first node, replacing the base VID of the third packet with the second VID; and transmitting the third packet towards the one of the second set of intermediate nodes along the second path;

wherein the one of the second set of intermediate nodes has a third processor, the third processor:

determining that the third packet must leave the second path at the intermediate node; and replacing the second VID with the base VID before transmitting the third packet to a next node, the next node not being on the second path.

17. The communications network of claim 15, further comprising:

at a node attached to the first node on the second set of intermediate nodes, a third processor, the third processor replacing the second VID with the base VID in the header of the third packet before transmitting the third packet to the first node.

18. The communications network of claim 12, further comprising:

the second node having a second processor, the second processor:

replacing the first VID in the header of the first packet with the base VID before transmitting the first packet to the destination.

19. The communications network of claim 18, wherein each of the second set of intermediate nodes has a third processor, the third processor:

receiving the first packet;

inspecting the first packet to determine whether the first packet must transit through the second node; and when the first packet must transit through the second node, transmitting the first packet along the second path to the second node without replacing the first VID of the packet.

* * * * *